United States Patent
Marupaduga et al.

(10) Patent No.: US 9,020,509 B1
(45) Date of Patent: Apr. 28, 2015

(54) DYNAMIC QRXLEVMIN AND SINTRASEARCH VALUES TO OPTIMIZE INTRA- AND INTER-FREQUENCY HANDOVERS IN LTE

(71) Applicant: Sprint Communications Company L.P., Overland Park, KS (US)

(72) Inventors: Sreekar Marupaduga, Overland Park, KS (US); Nicholas David Caola Kullman, Kansas City, MO (US); Rajveen Narendran, Olathe, KS (US); Andrew Mark Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 127 days.

(21) Appl. No.: 13/797,103

(22) Filed: Mar. 12, 2013

(51) Int. Cl.
*H04W 36/00* (2009.01)
*H04B 7/00* (2006.01)
*H04W 24/00* (2009.01)

(52) U.S. Cl.
CPC .................. *H04W 36/0083* (2013.01)

(58) Field of Classification Search
USPC .......................................... 455/436
See application file for complete search history.

(56) References Cited

U.S. PATENT DOCUMENTS

| | | | |
|---|---|---|---|
| 2006/0258386 A1* | 11/2006 | Jeong et al. .................. 455/525 |
| 2011/0182224 A1* | 7/2011 | Ishii ............................. 370/311 |
| 2011/0269447 A1* | 11/2011 | Bienas et al. ............... 455/422.1 |
| 2013/0295951 A1* | 11/2013 | Mach .......................... 455/456.1 |
| 2013/0303231 A1* | 11/2013 | Yiu et al. ...................... 455/525 |
| 2014/0036874 A1* | 2/2014 | Jeong et al. .................. 370/332 |
| 2014/0242993 A1* | 8/2014 | Dahlen et al. ................ 455/436 |

* cited by examiner

*Primary Examiner* — Timothy Pham

(57) ABSTRACT

A method and system are provided for dynamically changing Qrxlevmin and Sintrasearch values in a LTE network. An eNodeB sets the Qrxlevmin and Sintrasearch values for each mobile device. The Qrxlevmin value and Sintrasearch value are changed based on RF conditions and a velocity of the mobile device. A lower Qrxlevmin value coupled with a higher Sintrasearch value increases a search period to locate better performing neighboring cells and reduces the chance of handing down from the LTE network to a non-LTE network.

16 Claims, 3 Drawing Sheets

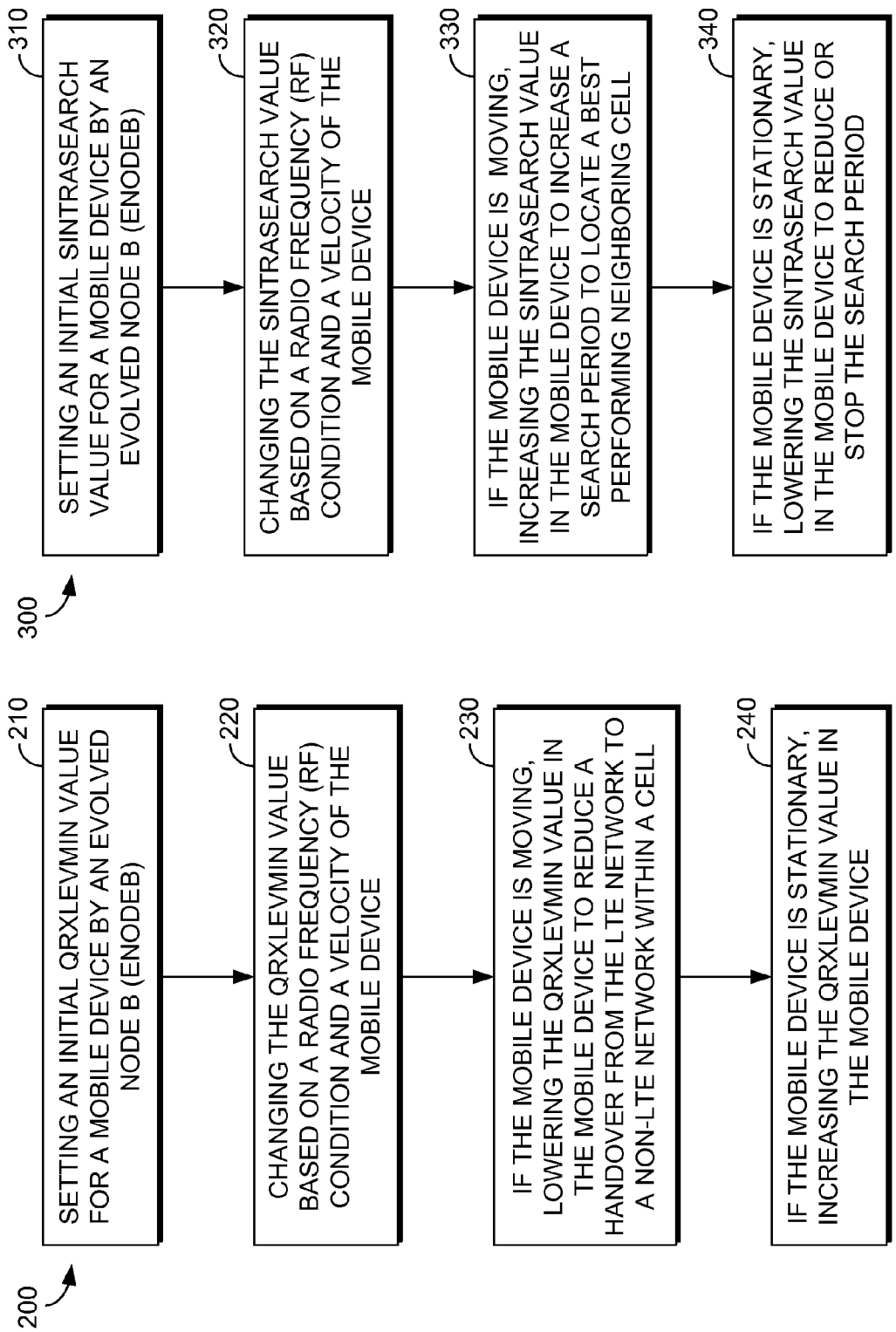

DYNAMIC QRXLEVMIN AND SINTRASEARCH VALUES TO OPTIMIZE INTRA- AND INTER-FREQUENCY HANDOVERS IN LTE

CROSS-REFERENCE TO RELATED APPLICATIONS

Not applicable.

BACKGROUND OF THE INVENTION

In present Long Term Evolution (LTE) networks, intra-frequency and Non-intra-frequency handovers occur when certain parameters pass specified thresholds. Hand downs or inter-radio access technology (i-RAT) handovers from LTE networks occur when the user equipment's (UE's) given Qrxlevmeas value passes a fixed value called Qrxlevmin. Qrxlevmin is a static value maintained within the LTE core network. This value's inflexibility results in situations where a mobile user is handed down to a non-LTE network prematurely even though another available physical-layer cell identity (PCI) would be available shortly. Handing down to a non-LTE network requires that the UE enters idle mode in order for the UE to again search for available LTE networks. With many applications on handsets being in an "always on" state, the time period until a UE enters idle mode again may be very long, and thus keep the UE from re-entering the LTE network for an extended period of time. Therefore, a solution is needed that would allow the Qrxlevmin and Sintrasearch values to be dynamic so that handovers and hand downs can occur more efficiently.

SUMMARY

Embodiments of the invention are defined by the claims below, not this summary. A high-level overview of various aspects of embodiments of the invention is provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

Embodiments of the present invention relate generally to a method and system for dynamically changing Qrxlevmin and Sintrasearch values in a Long Term Evolution (LTE) network. The values for Qrxlevmin and Sintrasearch are set initially by an evolved node B (eNodeB.) After monitoring radio frequency conditions and the speed of the mobile device, the eNodeB changes the values for Qrxlevmin and Sintrasearch in order to maintain the mobile device within the LTE network or to enable a greater search period for the mobile device to locate a cell for handover.

BRIEF DESCRIPTION OF THE SEVERAL VIEWS OF THE DRAWINGS

Illustrative embodiments of the present invention are described in detail below with reference to the included drawing figures, wherein:

FIG. 2 is a process for dynamically changing a Qrxlevmin value, implemented in accordance with an embodiment of the present invention;

FIG. 3 is a process for dynamically changing a Sintraserach value, implemented in accordance with an embodiment of the present invention.

DETAILED DESCRIPTION

Figure 1:
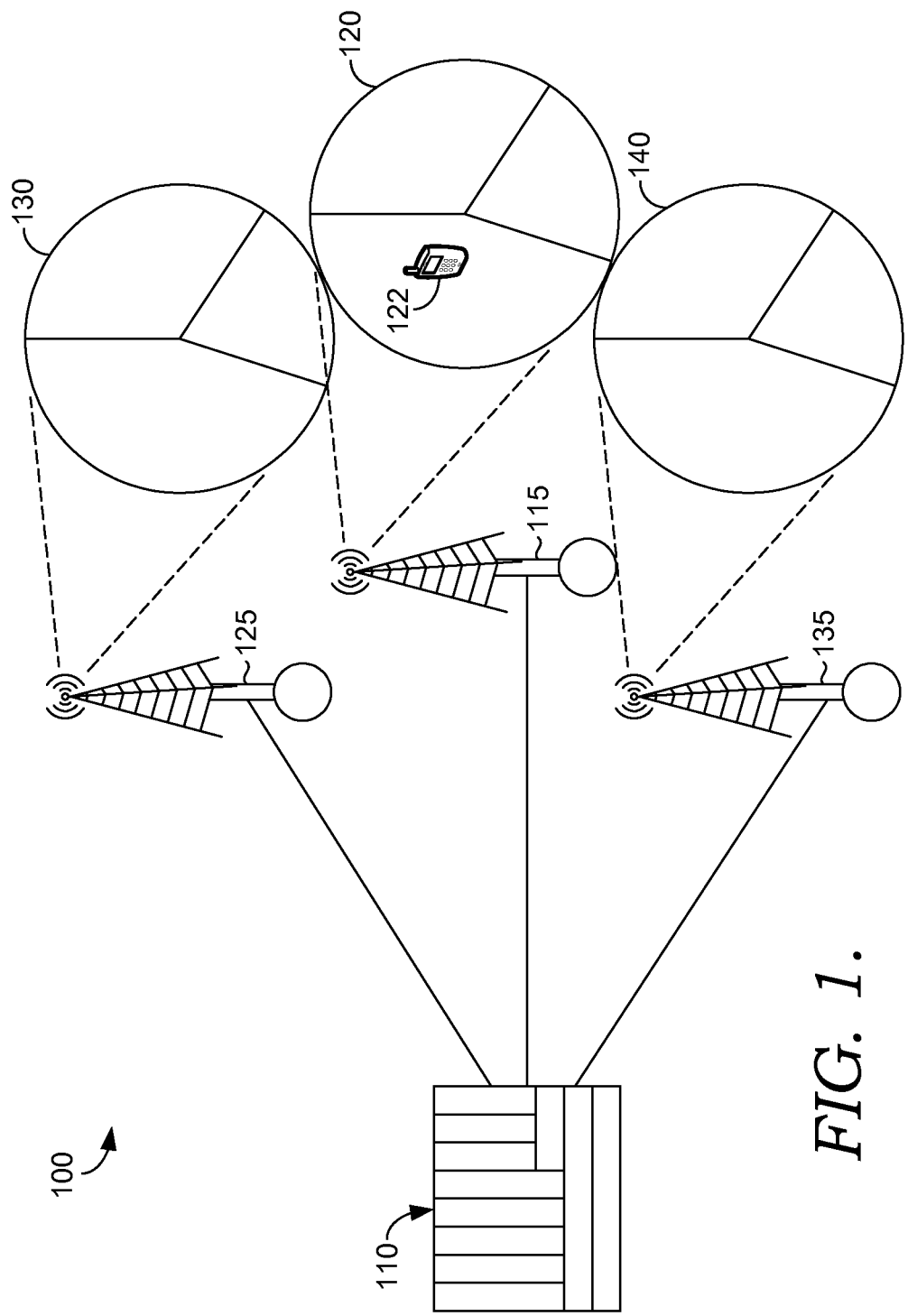
FIG. 1 is an exemplary illustration of a Long Term Evolution (LTE) wireless network in accordance with an embodiment of the present invention.

Embodiments of the present invention relate generally to a method and system for dynamically changing Qrxlevmin and Sintrasearch values in a Long Term Evolution (LTE) network. The values for Qrxlevmin and Sintrasearch are set initially by an evolved node B (eNodeB.) After monitoring radio frequency conditions and the speed of the mobile device, the eNodeB changes the values for Qrxlevmin and Sintrasearch in order to maintian the mobile device within the LTE network or to enable a greater search period for the mobile device to locate a cell for handover. As one reads the specification, the terms "value" and "parameter" may be used interchangeably.

In a first aspect, a method for implementing a dynamic Qrxlevmin value in an LTE network is provided that includes setting an initial Qrxlevmin value for a mobile device by an eNodeB. The Qrxlevmin value is changed based on a radio frequency (RF) condition and a velocity of the mobile device. If the mobile device is moving, the Qrxlevmin value is lowered for the mobile device to reduce a handover from the LTE network to a non-LTE network within a cell. If the mobile device is stationary, the Qrxlevmin value is increased for the mobile device.

In another aspect, a method for implementing a dynamic Sintrasearch value in a LTE network is provided that includes setting an initial Sintrasearch value for a mobile device by an eNodeB. The Sintrasearch value is changed based on a radio frequency (RF) condition and a velocity of the mobile device. If the mobile device is moving, the Sintrasearch value is increased for the mobile device to increase a search period to locate a best performing neighboring cell. If the mobile device is stationary, the Sintrasearch value is lowered for the mobile device to reduce or stop the search period.

In yet another aspect, a system for adjusting mobility parameters in a mobile device to improve a user experience and increase handoff efficiency is provided. An eNodeB operates to set an initial set of values in the mobile device. The initial set of values includes at least a Qrxlevmin value and a Sintrasearch value. The mobile device operates in a cell. The eNodeB monitors the mobile device and determines a radio frequency (RF) condition and a velocity of the mobile device. When the mobile device is moving, the eNodeB reduces the Qrxlevmin value for the mobile device and increases the Sintraserach value for the mobile device. A reduction in the Qrxlevmin value and an increase in the Sintrasearch value results in a preference for searching for cells for a handoff of the mobile device from the cell to another cell rather than handing down the mobile device from a LTE network to a non-LTE network in the cell. When the mobile device is substantially stationary, the eNodeB increases the Qrxlevmin value for the mobile device and reduces the Sintrasearch value for the mobile device. The increase in the Qrxlevmin value and the reduction in the Sintrasearch value result in the preference to keep the mobile device in the cell and an allowance to transition the mobile device between the LTE network and non-LTE network.

In FIG. 1, an exemplary LTE network 100 is shown with an evolved Node B (eNodeB) 110 communicating with a set of cell towers 115, 125, and 135. Each cell tower covers a cell site whereby mobile devices operating within the cell site may communicate with other devices. Cell tower 115 covers cell site 120. Cell tower 125 covers cell site 130. Cell tower 135 covers cell site 140. The cell towers and cell sites shown are an example of the cell towers and cell sites operating in an exemplary wireless network. As one of ordinary skill in the art knows, the number of cell towers and cell sites can vary depending on the configuration and implementation of the wireless network carriers. For illustrative purposes here, only three cell towers and cell sites are shown to discuss the invention. Likewise, an exemplary mobile device 122 is shown operating in cell site 120. In various wireless networks, numerous mobile devices operate in a cell site.

In an implementation of an embodiment of the present invention in an LTE network, a dynamic Qrxlevmin value is based partially on the mobility of the mobile device 122. For mobile devices that are moving, a lower Qrxlevmin value is assigned and for stationary mobile devices, a higher Qrxlevmin value is assigned. The mobility of mobile device 122 can be determined by global Positioning System (GPS) coordinates.

In another implementation of an embodiment of the present invention in an LTE network, a Sintrasearch parameter can dynamically be changed. Because of the Sintrasearch parameter, different values for the reference signal received power (RSRP) can be set. RSRP is an LTE metric that averages the RF power in all of the reference signals. Typically, RSRP for a usable signal quality ranges from −75 dBm to −120 dBM. However, other values for RSRP can be used and measured. For example, values for Qrxlevmin can range from −115 dBm to 25 dBm. With the Sintrasearch parameter, the value is implemented in a dynamic fashion in order to determine at what RSRP mobile device 122 begins searching for neighboring cells 130 and 140. For mobile users, the Sintrasearch value is increased.

By using a decreased Qrxlevmin value with an increased Sintrasearch value, a substantially greater search period for the mobile device 122 will occur to find the best performing cell or physical-layer cell identity (PCI). The combination of the Qrxlevmin and Sintrasearch values is used to provide access to the best performing cell prior to handoff. Likewise, these values also ensure mobile device 122 does not hand down to a less efficient network, such as a third generation (3G) network. The result of mobile device 122 being handed down to the less efficient network can cause a poor user experience for not entering the idle mode.

Just as the Qrxlevmin value can be decreased and the Sintrasearch value can be increased, the Sintrasearch value can be decreased for stationary users. Likewise, the Qrxlevmin value can be increased for the same stationary users. The idea here is that stationary users should experience nearly static RF conditions and have no need to continuously search neighboring PCIs. By reducing the measurement cycles initiated by breaking the Sintrasearch threshold, the battery life of mobile device 122 is improved.

The Qrxlevmin and Sintrasearch values are used in wireless LTE networks as thresholds. These thresholds indicate when a mobile device should begin either handing down to a non-LTE network within the cell or handing over to another cell. Qrxlevmin defines the minimum RSRP values measured by mobile device 122 in cell site 120 to get unrestricted coverage-based service in cell site 120. Sintrasearch, when added to Qrxlevmin, sets the threshold for mobile device 122 to decide if it has to perform intra-frequency cell measurements for potential cell reselection. If the current measured RSRP value for cell site 120 is greater than the threshold set up by the Sintrasearch parameter, then mobile device 122 is not required to perform intra-frequency measurements. If the current measured RSRP value drops below the threshold, then mobile device 122 is required to perform intra-frequency measurements for potential cell reselection. In this case, cell reselection would include considering cell sites 130 and 140 for transition by mobile device 122.

Turning now to FIG. 2, a method for implementing a dynamic Qrxlevmin value in an LTE network is provided in a process 200. In a step 210, an initial Qrxlevmin value for mobile device 122 is set by eNodeB 110. The Qrxlevmin value is changed based on an RF condition and a velocity of mobile device 122, in a step 220. As one of ordinary skill in the art knows, the RF condition within a cell site can vary due to a number of factors, such as physical obstructions. Further, the speed of a mobile device plays a role in determining when the mobile device might be near the edge of the cell site and ready for transition to another cell. In a step 230, if mobile device 122 is moving, the Qrxlevmin value is lowered to reduce a handover or hand down from the LTE network to a non-LTE network in cell site 120. In a step 240, if mobile device 122 is substantially stationary, the Qrxlevmin value is increased to allow the handover or hand down to occur.

In FIG. 3, a method for implementing a dynamic Sintrasearch value in a LTE network is provided in a process 300. In a step 310, an initial Sintrasearch value for mobile device 122 is set by eNodeB 110. In a step 320, the Sintrasearch value is changed based on a RF condition and a velocity of mobile device 122. If mobile device 122 is moving, the Sintrasearch value is increased to increase a search period to locate a best performing neighboring cell (cells site 130 or 140), in a step 330. In a step 340, if mobile device 122 is stationary, the Sintrasearch value is lowered to reduce or stop the search period.

Figure 4:
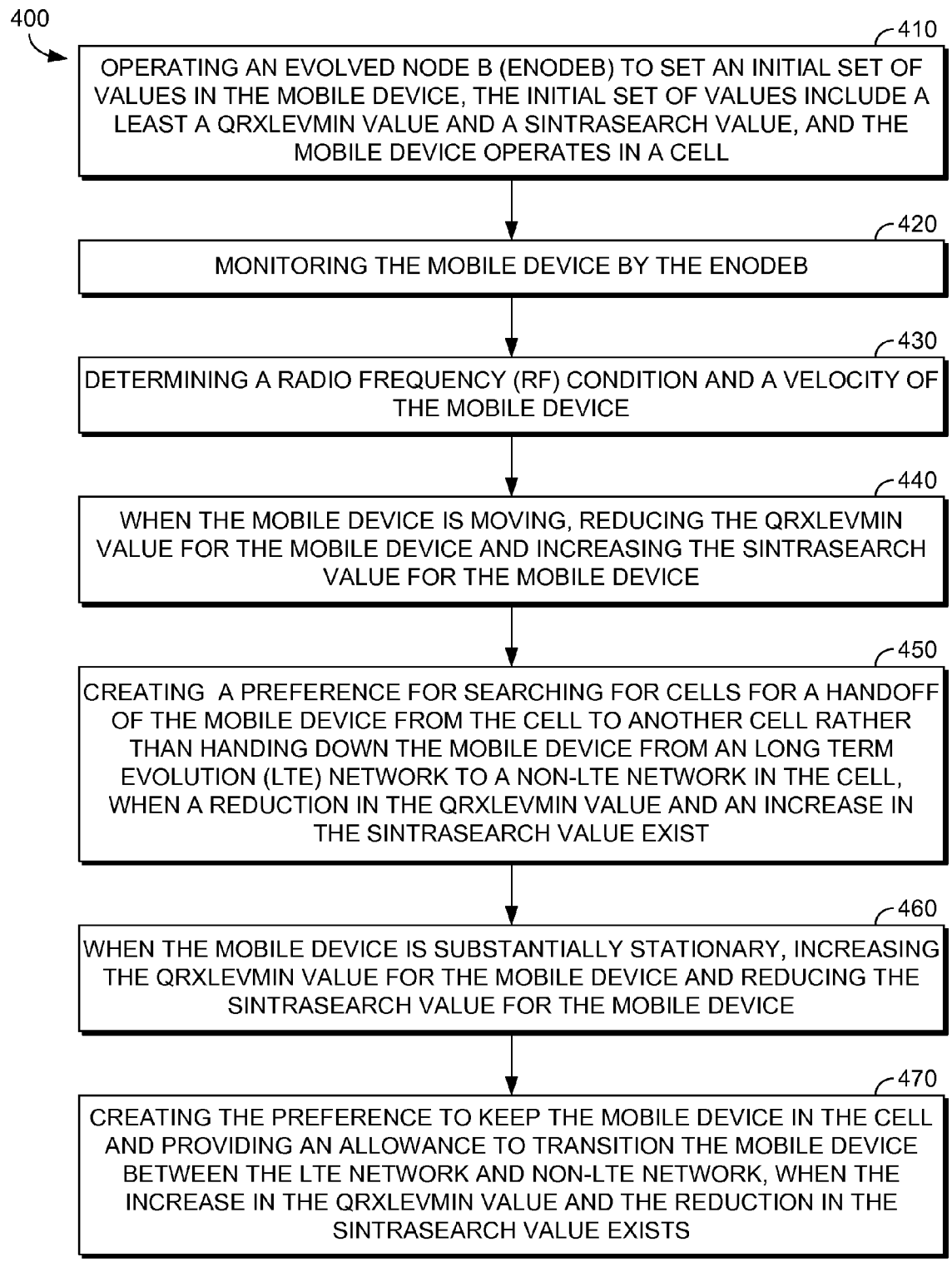
FIG. 4 is a process for dynamically changing Qrxlevmin and Sintraserach values, implemented in accordance with an embodiment of the present invention.

Turning now to FIG. 4, a method for adjusting mobility parameter in mobile device 122 to improve a user experience and increase handoff efficiency is provided in a process 400. In a step 410, an eNodeB 110 operates to set an initial Qrxlevmin value and an initial Sintrasearch value where mobile device 122 operates in cell site 120. In a step 420, eNodeB 110 monitors mobile device 122. An RF condition and a velocity are determined for mobile device 122, in a step 430. In a step 440, when mobile device 122 is moving, the Qrxlevmin value for mobile device 122 is reduced and the Sintrasearch value for mobile device 122 is increased. In a step 450, a preference is created for searching for cell sites 130 and 140 for a handoff of mobile device 122 from cell site 120 to cell site 130 or 140 rather than handing down mobile device 122 from an LTE network to a non-LTE network. This action occurs when a reduction in the Qrxlevmin value and an increase in the Sintrasearch value exist. When mobile device 122 is substantially stationary, the Qrxlevmin value for mobile device 122 is increased and the Sintrasearch value for mobile device 122 is decreased. In a step 470, a preference is created to keep mobile device 122 in cell site 120 and an allowance is provided to transition mobile device 122 between the LTE network and the non-LTE network. This action occurs when Qrxlevmin value is increased and the Sintrasearch value is reduced.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A method for implementing a dynamic Qrxlevmin value in a Long Term Evolution (LTE) network, comprising:
    setting an initial Qrxlevmin value for a mobile device by an evolved node B (eNodeB), wherein the Qrxlevmin value is a minimum reference signal received power value measured by the mobile device in a cell site to get unrestricted coverage-based service in the cell site;
    changing the Qrxlevmin value by the eNodeB based on a radio frequency (RF) condition and a velocity of the mobile device;
    if the mobile device is moving, lowering the Qrxlevmin value for the mobile device to reduce a handover from the LTE network to a non-LTE network within a cell; and
    if the mobile device is stationary, increasing the Qrxlevmin value for the mobile device.

2. The method of claim 1, further comprising setting an initial Sintrasearch value for the mobile device by the eNodeB.

3. The method of claim 2, further comprising changing the Sintrasearch value based on the RF condition and the velocity of the mobile device.

4. The method of claim 3, further comprising, if the mobile device is moving, increasing the Sintrasearch value for the mobile device to increase a search period to locate a best performing neighboring cell.

5. The method of claim 4, further comprising, if the mobile device is stationary, lowering the Sintrasearch value for the mobile to reduce or stop the search period.

6. The method of claim 1, wherein setting the initial Qrxlevmin value for a mobile device by an evolved node B (eNodeB) comprises setting the minimum reference signal received power (RSRP).

7. The method of claim 1, wherein the non-LTE network is selected from a group including third generation (3G) wireless networks.

8. A method for implementing a dynamic Sintrasearch value in a Long Term Evolution (LTE) network, comprising:
    setting an initial Sintrasearch value for a mobile device by an evolved node B (eNodeB), wherein at least the Sintrasearch value is a threshold for the mobile device to decide whether to perform intra-frequency cell measurements for cell reselection, wherein if the reference signal received power value drops below the threshold, the mobile device performs intra-frequency cell measurements for cell reselection;
    changing the Sintrasearch value by the eNodeB based on a radio frequency (RF) condition and a velocity of the mobile device;
    if the mobile device is moving, increasing the Sintrasearch value for the mobile device to increase a search period to locate a best performing neighboring cell; and
    if the mobile device is stationary, lowering the Sintrasearch value for the mobile device to reduce or stop the search period.

9. The method of claim 8, further comprising setting an initial Qrxlevmin value for the mobile device by the eNodeB.

10. The method of claim 9, further comprising changing the Qrxlevmin value based on the RF condition and the velocity of the mobile device.

11. The method of claim 10, further comprising, if the mobile device is moving, lowering the Qrxlevmin value in the mobile device to reduce a handover from the LTE network to a non-LTE network within a cell.

12. The method of claim 11, further comprising, if the mobile device is stationary, increasing the Qrxlevmin value in the mobile device.

13. The method of claim 12, wherein setting the initial Qrxlevmin value for a mobile device by an evolved node B (eNodeB) comprises setting the minimum reference signal received power (RSRP).

14. The method of claim 13, wherein the non-LTE network is selected from a group including third generation (3G) wireless networks.

15. The method of claim 8, wherein the cell is identified by a physical-layer cell identity (PCI).

16. A system for adjusting mobility parameters in a mobile device to improve a user experience and increase a handoff efficiency, comprising:
    an evolved node B (eNodeB) operable to set an initial set of values in the mobile device, wherein the initial set of values include at least a Qrxlevmin value and a Sintrasearch value, and wherein the mobile device operates in a cell;
    the eNodeB monitors the mobile device and determines a radio frequency (RF) condition and a velocity of the mobile device;
    when the mobile device is moving, the eNodeB reduces the Qrxlevmin value for the mobile device and increases the Sintrasearch value for the mobile device, wherein a reduction in the Qrxlevmin value and an increase in the Sintrasearch value results in a preference for searching for cells for a handoff of the mobile device from the cell to another cell rather than handing down the mobile device from a Long Term Evolution (LTE) network to a non-LTE network in the cell; and
    when the mobile device is substantially stationary, the eNodeB increases the Qrxlevmin value for the mobile device and reduces the Sintrasearch value for the mobile device, wherein the increase in the Qrxlevmin value and the reduction in the Sintrasearch value results in the preference to keep the mobile device in the cell and an allowance to transition the mobile device between the LTE network and non-LTE network.

* * * * *